(12) United States Patent
Karwowski et al.

(10) Patent No.: US 7,829,128 B2
(45) Date of Patent: Nov. 9, 2010

(54) PRODUCTION OF WHOLE GRAIN-CONTAINING COMPOSITE FOOD PRODUCTS

(75) Inventors: Jan Karwowski, Midland Park, NJ (US); Vani Vemulapalli, Morristown, NJ (US); Chen Y. Wang, Morris Plains, NJ (US)

(73) Assignee: Kraft Foods Global Brands LLC, Northfield, IL (US)

( * ) Notice: Subject to any disclaimer, the term of this patent is extended or adjusted under 35 U.S.C. 154(b) by 668 days.

(21) Appl. No.: 11/428,011

(22) Filed: Jun. 30, 2006

(65) Prior Publication Data

US 2008/0003340 A1   Jan. 3, 2008

(51) Int. Cl.
  *A21D 13/00* (2006.01)
(52) U.S. Cl. ........................ 426/94; 426/549
(58) Field of Classification Search .......... 426/94, 426/102
  See application file for complete search history.

(56) References Cited

U.S. PATENT DOCUMENTS

| | | | |
|---|---|---|---|
| 3,600,193 A * | 8/1971 | Glabe et al. ................ | 426/555 |
| 3,656,966 A | 4/1972 | Ball et al. | |
| 3,703,378 A | 11/1972 | Bretch | |
| 4,623,548 A | 11/1986 | Willard | |
| 4,623,550 A | 11/1986 | Willard | |
| 4,770,891 A * | 9/1988 | Willard ...................... | 426/559 |
| 4,777,045 A | 10/1988 | Vanderveer et al. | |
| 5,093,146 A | 3/1992 | Calandro et al. | |
| 5,132,133 A | 7/1992 | Huber et al. | |
| 5,731,029 A | 3/1998 | Karwowski et al. | |
| 6,455,089 B1 | 9/2002 | Kalnish et al. | |
| 6,479,090 B1 | 11/2002 | Carey et al. | |
| 6,482,430 B1 | 11/2002 | Weightman et al. | |
| 2003/0087012 A1 | 5/2003 | Metzger | |
| 2005/0064080 A1 | 3/2005 | Creighton et al. | |

(Continued)

FOREIGN PATENT DOCUMENTS

WO    96/19117 A1    6/1996

(Continued)

OTHER PUBLICATIONS

Manley, D. "Rotary moulding", in Technology of Biscuits, Crackers, and Cookies (3rd Edition), Woodhead Publishing, (2000), p. 374-387.*

(Continued)

*Primary Examiner*—Keith D Hendricks
*Assistant Examiner*—Elizabeth Gwartney
(74) *Attorney, Agent, or Firm*—Fitch, Even, Tabin & Flannery (57) ABSTRACT

Shelf-stable whole grain-containing composite food products, such as savory and sweet snacks and cereals, are continuously produced by preparing a dough comprising cooking whole grain cereal grain particles in the presence of water effective to gelatinize starch content of the whole grain cereal particles to provide gelatinized whole grain cereal grain particles, and mixing the gelatinized whole grain cereal grain particles with starch, whole grain flour, optional minor dough ingredients such as leavening agent, and a food component selected from the group consisting of vegetables and fruits, effective to prepare dough. The dough is formed into discrete dough units, which are baked or fried to provide a wholegrain containing composite food product that is nutritious, low fat, multi-flavored, and a good source of dietary fiber.

37 Claims, 2 Drawing Sheets

U.S. PATENT DOCUMENTS

| | | |
|---|---|---|
| 2005/0129817 A1 | 6/2005 | Malecha et al. |
| 2005/0208191 A1 | 9/2005 | Saimanohar et al. |
| 2006/0073239 A1 | 4/2006 | Boyle et al. |
| 2006/0073258 A1 | 4/2006 | Korolchuk |
| 2006/0286270 A1* | 12/2006 | Jordan .................. 426/620 |

FOREIGN PATENT DOCUMENTS

| | | |
|---|---|---|
| WO | 03/056937 | 7/2003 |
| WO | WO-2005/087018 A1 | 9/2005 |

OTHER PUBLICATIONS

Patent Abstracts of Japan, Publ. No. 03072852 A, "Preparation of Whole Wheat Food Containing Whole Wheat Grain Component . . . ", Mar. 28, 1991, 1 pg., JPO&Japio.

* cited by examiner

PRODUCTION OF WHOLE GRAIN-CONTAINING COMPOSITE FOOD PRODUCTS

FIELD OF THE INVENTION

The present invention relates to production of composite food products, such as snacks and ready-to-eat cereals, from combinations of gelatinized whole cereal grains and other natural foods.

BACKGROUND OF THE INVENTION

Whole cereal grains are nutritious and provide high dietary fiber content. Sheeted or molded products have been made with whole grain wheat. Generally, rotary molded snacks and sheeted snacks are typically made with raw wheat flour. Wheat is unique in that it contains gluten, which helps to retain water, and provides cohesiveness and elasticity during machining. In a rotary molding process, even though gluten is not developed, much of the cohesiveness of dough comes from high addition levels of plastic shortening and to some extent from sugar in the formulation. In a sheeting process, gluten is developed which keeps the dough cohesive. Doughs made with other grain flours besides wheat flour do not tend to form cohesive dough because of their unique compositions which lack gluten, even in the presence of high levels of plastic shortening and sugar in the dough formulation. In particular, starch-based dough compositions, which have little or no gluten, when mixed with water, do not tend to form dough that is cohesive at room temperature and continuously machinable or sheetable.

U.S. Pat. Nos. 4,623,548 and 4,623,550 describe dough that is prepared using pre-gelatinized cereal flours/starches, partially gelatinized cereal flours/starches, and raw flours/ starches to form dough having moisture of 40-50% for preparing extruded and sheeted fried snacks. Gelatinization is a function of water penetration into the whole berry, temperature, and time, for a given type of grain. According to U.S. Pat. No. 4,179,527, the gelatinization of wheat starch involves a destruction of bonds in the crystalline regions of starch granules.

In U.S. Pat. No. 897,181, cereal grain or vegetable in whole form is wetted but not cooked and then passed repeatedly between grooved rollers and then baked. Boiling or steaming of the grain or vegetable, it is disclosed, produces considerable change in its chemical quality and a number of the nutritious soluble elements escape to the water.

In U.S. Pat. No. 3,462,277, a mixture of cereal flour or grits and water is passed through an extruder to gelatinize the starch while the dough is cooked and transformed into a rubber-like mass. The moisture content of the mixture is 13 to 35%. The continuous U-shaped extrudate is pinched off into segments by cutting rolls to form canoe-shaped cereal products. The separated canoe-shaped pieces are then dried to below 15% moisture.

In U.S. Pat. No. 3,512,990 a dough, made from farinaceous materials such as wheat, corn, oats, rice, potatoes, or legumes, is optionally partially or completely cooked with added moisture, to an approximate moisture content of about 30%. After this cooking step, the mixture is rendered homogeneous by passing it through an extruder or a hammer mill, such as Fitzmill. The milled or extruded product is dried to an approximate moisture content of 22 to 24%. The dried dough is then compacted between two rolls to provide a shredding effect and produce a sheet of dough having diamond-like regularly spaced perforations. The sheet of dough is then severed into strips, folded to form small biscuits, which are closed on three, sides and then deep-fried.

In U.S. Pat. Nos. 987,088, 1,019,831, and 1,021,473, corn or another grain is ground and immersed in an amount of water which is limited to that which will be taken up by the grain during cooking. The purpose of this is to preserve in the cooked article the aroma and other properties of the grain, which might otherwise be carried off or dissipated by the evolution of steam or vapor. In these processes, the cooked dough is extruded through a perforated plate to obtain filaments.

SUMMARY OF THE INVENTION

Shelf-stable whole grain-containing composite food products, such as savory and sweet snacks and ready-to-eat cereals, are continuously produced by preparing a dough by cooking whole grain cereal grain particles in the presence of water effective to gelatinize starch content of the whole grain cereal particles to provide gelatinized whole grain cereal grain particles, which are mixed with starch, whole grain flour, optional minor dough ingredients such as leavening agent, and a food component selected from the group consisting of vegetables and fruits, effective to provide a dough. The dough is formed into discrete dough units, which are baked or fried to provide a shelf-stable whole-grain containing composite food product that is nutritious, low fat, multi-flavored, and a good source of dietary fiber. In particular embodiments, shelf-stable high vegetable/fruit content food products made from dough with reduced requirements for shortening and sugar in the dough formulation are produced.

In one particular embodiment, preground whole grain particles are pregelatinized in situ under atmospheric pressure conditions in a dough mixer adapted for steam injection or other functionally comparable cooking vessel that is open to the atmosphere. The procedure generally involves cooking of whole grains alone to a pregelatinized condition, and then introducing whole grain flour, raw and/or pregelatinized starch, a fruit or vegetable component, and optional minor dough ingredients such as leavening agents, etc., in the dough mixer with mixing effective to provide a cohesive sheetable dough, and then shaping and sizing the dough into individual units or pieces before baking or frying the dough pieces to yield a snack product.

In another particular embodiment, pre-ground whole grain cereal particles are cooked in the presence of water under vacuum pressure conditions or superatmospheric pressure conditions either alone or in the presence of fruit or vegetables sufficient to develop gelatinized whole grain particles, and the gelatinized whole grains are combined with fruit or vegetables, if not done already, and the gelatinized whole grains/fruit or vegetable combination is passed through a low shear extruder to form a cohesive sheetable dough in the form of an extrudate. In a particular embodiment, the fruit or veggie component and a portion of the whole grain particle ingredient may be vacuum cooked, and the remainder of the whole grain particle ingredient in combination with other dry ingredients such as starch, whole grain flour, leavening agent ingredients and so forth can be separately steam heated in the presence of water sufficient to also develop gelatinized whole grain particles in the steam heated mixture, and then the resulting vacuum and steam heated mixtures can be combined and mixed to prepare dough. The extrudate can be fed to a rotary molder, or sheeting rolls and a cutting device, or other equipment arrangements suitable for shaping and sizing the doughy extrudate into discrete dough pieces. The dough units or pieces of desired shape and size are baked or fried to provide a whole grain-containing composite food product.

The gelatinized starch developed in the cooked whole grain(s) assists in the formation of cohesive dough even with no or very low addition amounts of shortening or fat and/or sugar to the dough formulation. The dough retains its cohesiveness and strength during machining and can be shaped and sized into discrete units by any one of a variety of convenient shaping/sizing techniques without falling or tearing apart. In one embodiment, the dough containing the gelatinized whole grain particles maintains acceptable machinability while containing less than 30 wt. %, more particularly less than 5 wt. % of sugar; and less than 5 wt. %, more particularly less than 1 wt. %, shortening or similar fat ingredients, although not limited thereto. The shelf-stable composite food product of embodiments herein may contain the food component selected from the group consisting of vegetables and fruit in a range amount of about 1 wt. % to about 60 wt. %, particularly about 5 wt. % to about 45 wt. %, more particularly about 10 wt. % to about 32 wt. %, and even more particularly about 15 wt. % to about 28 wt. %, on a dry weight basis, of the finished composite food product, without compromising dough machinability or the shelf stability of the whole grain-containing composite food product. The whole grain-containing composite products of this invention maintain structural integrity as discrete shapes and are shelf-stable even at such high addition rates of fruits and vegetables. For purposes herein, "shelf stable" generally means the composite food products, as stored under ambient conditions (i.e., about 72° F. in packaging commonly used for snack chips or thin crackers and the like), are safe for consumption. Shelf stability is determined by safety or microbiological stability according to standard industry tests used therefor. In a particular embodiment, the whole-grain containing composite food products of the invention are shelf-stable for at least about six months or preferably about nine to twelve months or more for products held at ambient temperature. For purposes herein, product "shelf life" is determined by organoleptic or eating quality of products.

The vegetables and fruits also impart a unique veggie or fruity taste, respectively, in the whole grain-containing composite food products of embodiments herein, and serve as a natural source of vitamins and/or minerals, and other nutrients, to reduce macronutrient/micronutrient supplementation needs/costs and provide more bioavailable forms of such naturally-delivered nutrients. The fruit, when used, may be selected from figs (prunes), bananas, citrus fruits, cranberries, apples, strawberries, blackberries, blueberries, raspberries, peaches, apricots, pears, pineapples, oranges, grapes, and the like and any combination thereof. The vegetables, when used, may be selected from the group consisting of sweet potatoes, potatoes, cabbage, onions, carrots, spinach, broccoli, peas, beans, peppers, zucchini, okra, Brussels sprouts, cucumber, tomatoes, and the like and any combinations thereof. The fruit and vegetables may be used in the form of whole raw products thereof, whole frozen products thereof, whole evaporated products thereof, whole pre-cooked products thereof, whole juices thereof, whole purees thereof, whole fruit concentrates, whole powders thereof, and any combination thereof. The whole grain particles and fruit or vegetable food component may be combined in a mixing ratio of about 20:80 to about 95:05, and particularly about 30:70 to about 50:50, on a wt %:wt % basis, respectively, although the ratio may vary depending on the relative moisture and solids contents of the two ingredients.

Any whole grain or multi-whole grain combinations may be used in embodiments of the present invention. The whole grains used in embodiments herein may comprise high-gluten whole grains such as wheat and/or non-glutenous or low-gluten content whole grains, e.g., corn, barley, rice, rye, oats, and triticale, or any combination thereof. In a particular embodiment, the whole grains include non-glutenous or low-gluten content whole grains. These whole grains may be used singly or in multi-grain combinations thereof. Composite products of embodiments of the invention include, e.g., whole grain snacks and ready-to-eat cereals, made from one or more non-glutenous or low-gluten whole grains. The method may also be employed with whole wheat alone or in combination with other whole grains to provide an enhanced crispy texture in the product.

As will be appreciated, the methods of the present invention can be used to make unique and improved wholesome whole grain snacks with any grain or grain combinations. In addition whole grains may be used in combination with real fruits or veggies to create shelf stable healthy snacks with enhanced flavoring. The texture of snacks made with cooked whole grains is unique in terms of its bite and crunchiness versus traditional rotary molded/sheeted snacks. In a preferred embodiment, the snacks products containing the whole grain and fruit or veggie content in accordance with embodiments of the present invention are crunchy chip-like snack products, instead of being chewy type snack foods. The food products of this invention can be formulated to have excellent source of whole grains and good source of dietary fiber (depending on the type of whole grain/real fruits/real vegetables used), as well as providing low (saturated) fat content, low or zero trans fatty acid content, low or zero cholesterol content, and they can be produced in a low sodium format. As indicated, the inventive methods may be used to make cereals, sweet and salty snacks, and other food products, which also represent unique shelf-stable snacks and food products. The composite food products of this invention also optionally may be prepared without adding the fruit or vegetable content, with processing otherwise proceeding in a generally similar manner as described herein, with the understanding that the benefits of the fruit/vegetable component will be absent from the product.

DETAILED DESCRIPTION OF THE INVENTION

The present invention provides a method for making whole grain-containing composite products, such as savory or sweet snacks (e.g., chips, crackers, wafers, biscuits, and so forth) and ready-to-eat cereals, and other food products. The products may be made with 100% whole grains can be formulated to have an excellent source of whole grain nutrition and good source of fiber.

Figure 1:
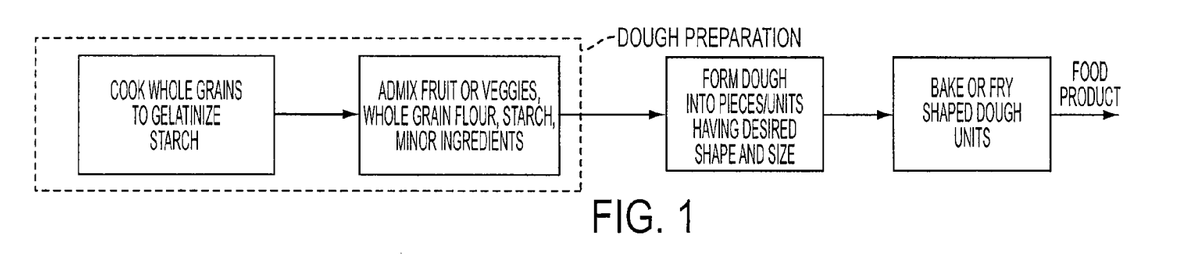
FIG. 1 is a flow chart showing a general method for making a whole-grain containing composite food product of the present invention.
Figure 2:
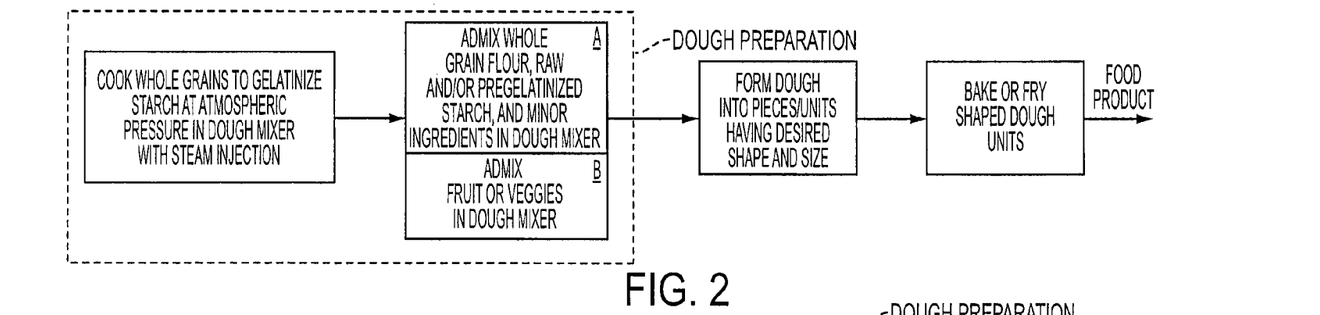
FIG. 2 is a flow chart showing a method for making a whole-grain containing composite food product according to an embodiment of the present invention wherein a whole grain ingredient is cooked under atmospheric pressure conditions.
Figure 3:
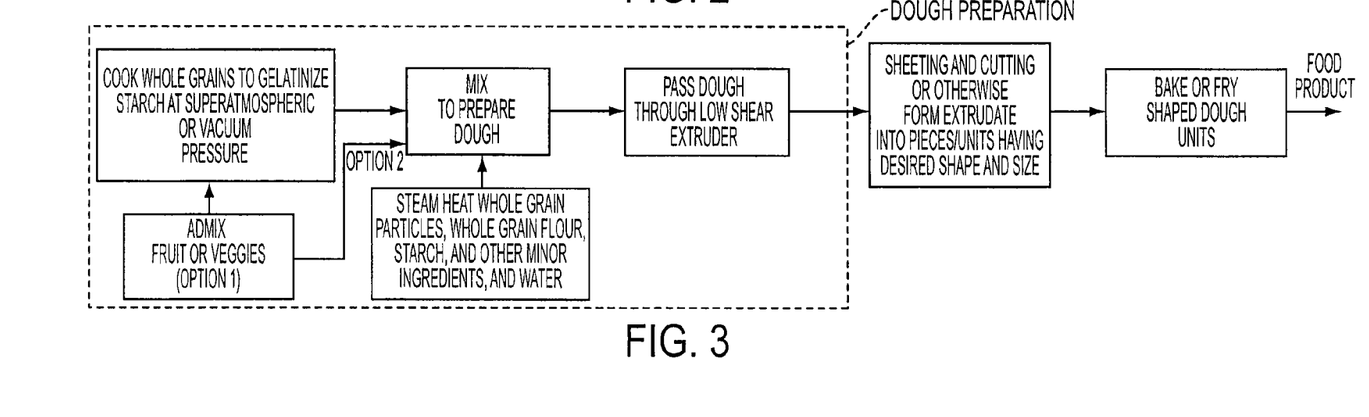
FIG. 3 is a flow chart showing a method for making a whole-grain containing composite food product according to an embodiment of the present invention wherein a whole grain ingredient is cooked under vacuum or positive pressure conditions.

Referring to FIG. 1, the flow chart shows a general process scheme for making whole grain-containing composite food products in accordance with various illustrative embodiments of the present invention. As illustrated, shaped and sized snack foods are produced by a series of steps including a) dough preparation with the in situ generation of gelatinized whole grain content that is combined with fruit or vegetable content, whole grain flour, starch, and optional minor dough ingredients, b) dough forming to provide discrete dough units or pieces having desired shape and size, and c) baking or frying the dough units to provide shelf-stable whole grain-containing composite food products. In FIGS. 1-3, processing related to dough preparation is indicated by the steps bounded by the box drawn in broken lines. In one embodiment, the dough maintains acceptable machinability for sheeting and cutting/forming operations and the like while containing no or very low amounts of sugar and no or very low amounts of plastic shortening or similar fats. In one embodiment, machinable dough is provided by embodiments of the present invention that contain less than 30 wt. %, more particularly less than 5 wt. % of extraneously added granulated or crystalline sugar; and less than 5 wt. %, more particularly less than 1 wt. %, extraneously added shortening or similar fat ingredients. The reduction in sugar and shortening requirements for the dough reduces materials costs as well as the carbohydrate and/or fat content of the products. In methods of the present invention, a whole grain composite food product may be produced continuously on a mass production basis, or alternatively non-continuously (e.g., by chilled or frozen storage of dough for a hold time prior to dough forming and baking).

Method With Whole Grain Cooking Under Atmospheric Pressure. Referring to FIG. 2, in this particular embodiment preground whole grain particles are heated/cooked in the presence of water under atmospheric pressure conditions, such as in a dough mixer adapted for steam injection and open to the atmosphere, at a temperature and for a time effective to pregelatinize at least a portion, and preferably essentially completely, all of the whole grain particles. The cooking temperature may range, for example, from about 120° F. to about 200° F., particularly about 140° F. to about 160° F., which may vary depending on the type of whole grain being treated and the duration of the cooking cycle. After the whole grain particles are cooked sufficiently to become gelatinized, an extraneous source of starch, such as raw and/or pregelatinized starch, (dry-milled) whole grain flour, along with fruit or vegetables, and optional leavening agents and/or other minor dough ingredients, are introduced into the dough mixer, and the resulting combination is blended in the dough mixer until a substantially uniform mixture having a dough-like consistency is provided. The mixing provided should be sufficient to uniformly disperse the dough ingredients and form a substantially uniform homogenous mixture. The mixing time may vary, depending on temperature conditions, mixing speed, and the proportions of the respective ingredients.

The extraneous whole grain flour and starch source used in this embodiment assist in reducing moisture content and stiffening the dough to even further enhance its tolerance of sheeting or other dough machining treatments without tearing. Typically the whole grain flour and starch sources are used in dry milled forms. The cooked (in situ gelatinized) whole grain-containing material mixed with the extraneous raw or pre-gelatinized whole grain flours/starches and real fruits or vegetables can be formulated to provide a dough-like material with optimum moisture level for sheeting, etc. The extraneous starch source may comprise, for example, pregelatinized waxy starch or modified waxy starch such as waxy maize, a granular cereal starch, a granular potato or tapioca starch, combinations thereof, and the like. The starches include starches such as corn starch, potato starch, tapioca starch, rice starch, and modified or pregelatinized waxy starches such as those from waxy maize, sorghum, rice and mixtures thereof. These starch sources can be used singly or in combinations thereof. One preferred form of pregelatinized starch source, which can be used, is modified or pregelatinized starch from waxy maize. The total amount of raw and/or pregelatinized starch source added may vary, depending on the type of starch and the other dough ingredients, but generally may comprise about 2 wt. % to about 25 wt % of the dough. The dry-milled whole grain flour ingredient added in the dough preparation step of this embodiment may comprise, for example, cereal flour components selected from one or more of wheat flour, corn flour, oat flour, barley flour, rye flour, rice flour, and mixtures thereof. The whole grain flour may be non-gelatinized ("raw"), or partially gelatinized, or combination of raw and partially gelatinized whole grain flour may be used. The partially-gelatinized whole grain flour, if used, may comprise, e.g., dry finely-milled, pregelatinized rice flour, and the like. The whole grain flour may be bleached or unbleached. The total amount of extraneous dry whole grain flour added may vary, depending on the type of whole grain flour and the other dough ingredients such as the extraneous starch source and its amount of addition, but generally may comprise about 0 wt. % to about 50 wt %, particularly about 5 wt. % to about 20 wt %, and more particularly about 10 wt. % to about 18 wt. %, of the dough.

The dough formulation also may include one or more minor dough ingredients in effective amounts for their respective function or purpose, such as leavening agents, baking soda, vegetable oil, honey, salt, lime (calcium hydroxide), quick cooking agents (disodium phosphate), emulsifiers, dough conditioners, reducing agents, oxidizing agents, and so forth. Leavening agents may be added to the dough in an effective amount to improve color, texture, and other sensory attributes. The leavening agents may comprise, e.g., sodium bicarbonate, ammonium bicarbonate, sodium aluminum phosphate, and the like.

The total moisture content (from all sources) of the dough formulation is generally in the range of about 25 wt. % to about 50 wt. %, and particularly about 35 wt. % to about 45 wt. %. The amount of moisture present should be sufficient to provide a dough consistency that is suitable for proper forming and shaping, machining, and cutting of the dough. For example, the dough should not be unduly stiff or sticky, and have a consistency that can be sheeted and shaped using conventional cutting apparatus or rotary molding apparatus, and the like. As previously indicated, the doughs of the present invention can be formulated with zero or very limited amounts of sugar or shortening needed to provide cohesive sheetable dough.

Although not required, the cooked whole grains optionally may be cooled to ambient temperature before their combination with the fruit or vegetables and extraneous starch source(s), which can further help prevent dough stickiness during dough machining operations such as sheeting. For example, cold air may be injected into the cooker and/or a cooling jacket associated with the cooker may be used in this respect, such that any cooling can be effected relatively quickly without tempering the grains. One of the discoveries of the present invention is that the dough composed of gelatinized whole grains and fruit or vegetables can be fed directly in its mixed heated condition (e.g., about 120° F. to about 200° F.) from the dough mixer to dough machining stations, such as sheeting or rotary molding equipment, without being unsheetable due to inordinate dough stickiness. This direct "hot" feeding methodology increases productivity and reduces costs on the production line.

The dough prepared with the gelatinized whole grains developed under atmospheric pressure conditions, extraneous starch, and fruit or vegetables is formed into discrete units or pieces of desired shape and size. The dough is cohesive and easily feeds into rotary molder or sheeting rolls or a forming extruder to form products in desirable shapes and sizes. The dough may be formed by sheeting and cutting, rotary molding, or other suitable processing for shaping and dividing the dough into discrete dough units of preselected shape and size. Other methods of forming and shaping the dough into pieces may include, for example, wire cutting, stamping, extruding and the like. The discrete dough units or pieces are baked or fried to provide a whole grain-containing composite food product. For instance, dough may be sheeted and cut, or rotary molded, into individual bite-size chips or thin wafers, which are baked or fried to provide a product material. The baked or fried composite food product material optionally may be seasoned, oiled, and/or packaged.

Significant amounts of fruit or vegetables may be incorporated into the dough without compromising dough machinability or shelf stability of the composite food product. The fruit or vegetable content of the food product imparts added nutritional value, multi-flavoring, and/or additional dietary fiber content, enhancing the quality of the food product. The shelf-stable composite food product of embodiments herein may contain the food component selected from the group consisting of vegetables and fruit in a range amount of about 1 wt. % to about 60 wt. %, particularly about 5 wt. % to about 45 wt. %, more particularly about 10 wt. % to about 32 wt. %, and even more particularly about 15 wt. % to about 28 wt. %, on a dry weight basis, of the finished composite food product, without compromising dough machinability or the shelf stability of the whole grain-containing composite food product. In a particular embodiment, the composite food products contain and deliver high fruit or vegetable content per serving, such as approximately 0.30-0.70 ounce of vegetable or fruit (solids basis) per one ounce serving of the whole grain-containing composite food product. In one particular embodiment, products are made with 100% whole grains and 100% real (natural) whole fruits or vegetables. In a particular embodiment, the combination of whole grain and fruit or vegetables are in a mixing ratio of about 20:80 to about 95:05, and particularly about 30:70 to about 50:50, on a wt %:wt % basis, respectively, although the ratio may vary depending on the relative moisture and solids contents of the two ingredients. Emulsifiers, vitamins, minerals, flavors/seasonings, and other ingredients optionally can be incorporated into the dough to further enhance the nutrition, taste, and texture of the composite products.

Figure 4:
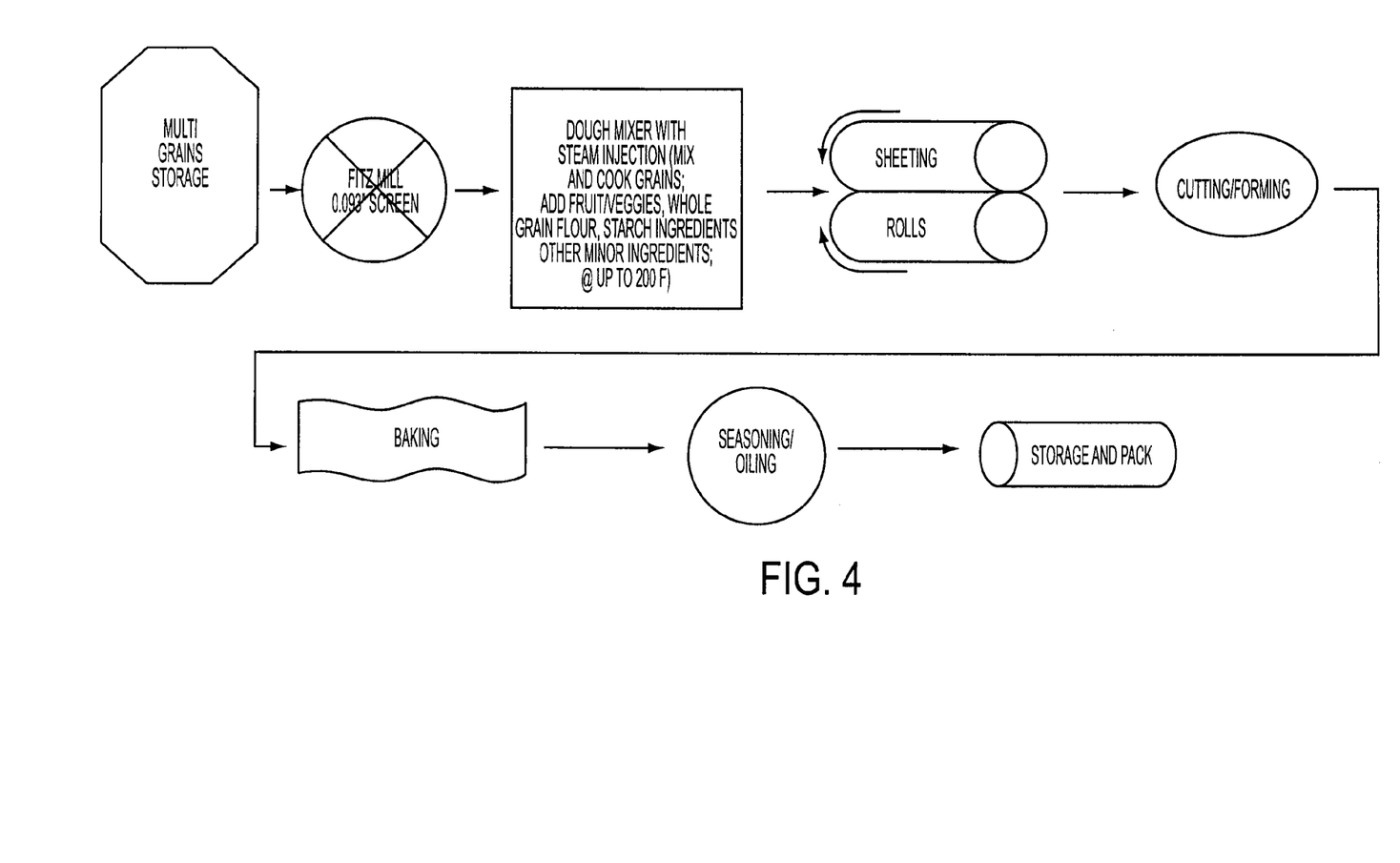
FIG. 4 is a flow chart showing a method for making a whole-grain containing composite food product according to a particular embodiment of the present invention wherein a preground whole grain ingredient is cooked under atmospheric pressure conditions in combination with subsequent sheeting/cutting and baking steps.

Referring to FIG. 4, a non-limiting illustration of the method of FIG. 2 is provided in which a whole grain or multiple whole grains are preground using Fitzmilling (0.093 inch screen), then cooked in a Peerless or Shaffer dough mixer with steam injection at a temperature up to 200° F. for a time and temperature sufficient to gelatinize the whole grain particles. Then fruit or vegetables ("veggies"), extraneous starch source(s), whole grain flour, and leavening agent and/or other minor dough ingredients, are added to the gelatinized whole grain in the dough mixer with mixing, with above-indicated temperature value maintained, until a substantially uniform dispersion of the added ingredients is provided and a mixture is provided having a dough-like consistency. In this illustration, the resulting dough is sheeted between counter-rotating rolls and then cut/formed into discrete dough pieces or units, which are then baked. The baked products are seasoned and oiled, prior to storage and packing.

Method With Whole Grain Cooking Under Superatmospheric or Vacuum Pressure. Referring to FIG. 3, in another particular embodiment pre-ground whole grain cereal particles are cooked in the presence of water under vacuum pressure conditions or superatmospheric pressure conditions either alone or in the presence of fruit or vegetables ("option 1") sufficient to develop gelatinized whole grain particles, and the gelatinized whole grains may be combined with fruit or vegetables for the first time in this process scheme or alternatively additional fruit or vegetables may be introduced ("option 2"), and the gelatinized whole grains/fruit or vegetable combination is passed through a low shear extruder to form dough in the form of an extrudate. In a particular embodiment, as shown in FIG. 3, the fruit or veggie component and a portion of the whole grain particle ingredient may be vacuum cooked, and the remainder of the whole grain particle ingredient in combination with other dry ingredients such as starch, whole grain flour, leavening agent ingredients can be separately steam heated in the presence of added water sufficient to develop gelatinized whole grain particles in the steam heated mixture, and then the resulting vacuum and steam heated mixtures can be combined and mixed to prepare dough. The vacuum cooking may be conducted without extraneous addition of water, such as with moisture-containing fruit or veggie ingredients. Shearing and compaction of the combined cooked grain particles and food component in the low shear extruder softens/plasticizes the matrix and generates enough of friction/heat to make it pliable, and less hard and rubbery, and ready for shaping and sizing while avoiding stickiness problems. Although not required, the cooked whole grains optionally may be cooled to ambient temperature before being passed through the low shear extruder, which may even further help prevent the dough from being sticky during dough machining operations such as sheeting or rotary molding.

The extrudate obtained from the low shear extruder can be fed to a rotary molder, or sheeting rolls and a cutting device, or other equipment arrangements suitable for shaping and sizing the doughy extrudate into discrete dough pieces. The extrudate, e.g., in the form of continuous ropes, bars, noodles, strands or other machinable cross-sectional shapes, may be fed into rotary molder or sheeting rolls. The consistency of the extrudate is such that it easily feeds into the cavity of the rotary molder or sheeting rolls. The dough units or pieces of desired shape and size are baked or fried to provide a whole grain-containing composite food product. During the baking process emboss on the product stays intact without being distorted.

Fruit and Vegetable Food Components. The fruit or vegetable ingredient may be added to dough ingredients in the cooker in raw uncooked form, frozen form, dried form, or precooked form, and also may be used as an intact whole or as a selected portion(s) or in a pre-processed form thereof.

The natural fruit may be selected from, for example, figs (prunes), bananas, citrus fruits, cranberries, apples, strawberries, blueberries, raspberries, peaches, apricots, pears, pineapples, oranges, grapes, and so forth and combinations thereof. Portions of whole fruit may be selectively used, such as the flesh portions less seeds and/or skins/and/or not edible core. The fruit component may comprise one or more of whole fruit, whole fruit purees, 100% fruit juices, whole frozen fruit, whole evaporated fruit, whole fruit powders, or combinations thereof. For example, evaporated apples stored at refrigerated conditions and apple powder is commercially available which may be used in the methods of the present invention. The evaporated apples preferably are passed through a Hobart meat grinder or device prior to adding them to the cooker.

The natural vegetable that can be used can be selected from, for example, onions, potatoes, sweet potatoes, cabbage, carrots, spinach, broccoli, peas, beans, peppers, zucchini, okra, Brussels sprouts, cucumber, tomatoes, and so forth and combinations thereof. Portions of the whole vegetables may be selectively used, such as the flesh portions less seeds and/or skins. Alternatively, or in addition thereto, cooked and pasteurized vegetable purees/vegetable powders/frozen vegetables/evaporated vegetables/100% vegetable juices/100% vegetable concentrates can be used. For example, dry vegetable granules and frozen vegetables are commercially available which may be used in the methods of the present invention. The frozen vegetables preferably are passed through a Hobart meat grinder or device prior to adding them to the cooker.

The composited whole grain/fruit or vegetable products are good to excellent source of whole grains as well as good source of fiber (depending on the whole grains/real fruits/real vegetables used). In addition the composite product offers unique nutritional health benefits derived both from whole grains and whole fruits or vegetables. The fruits or vegetables also serve as a natural source of vitamins and/or minerals, and other nutrients, to reduce macronutrient/micronutrient supplementation needs/costs and provide more bioavailable form of such naturally delivered nutrients. The fruits develop and impart a unique fruity taste in the composite product. The vegetables develop and impart a unique vegetable taste in the composite product. These composite products are a convenient form of delivery of both whole grains and whole fruits or vegetables in a ready-to-eat shelf stable product. The whole grains and real fruits or real vegetables compliment each other in nutrition, texture, and overall eating properties. Composite products may be formulated to have excellent source of whole grains, good source of dietary fiber, low or zero trans fatty acid sources, low saturated fat sources, low or zero cholesterol sources, and can be made with low sodium content, and so forth. In view of the fruit or vegetable content, they also can contain vitamins, minerals, antioxidants, and additional dietary fiber, depending on the particular fruit or vegetable added.

Other advantages of this and other embodiments of the invention include the versatility that the procedure offers in terms of using whole/pre-ground whole grains, method of cooking, and ability to incorporate other ingredients to improve the functionality, nutrition, and overall acceptance of the products. In addition, by using of different cutter designs and rotary molding patterns, the product geometry and pattern of composite products of embodiments of this invention can be changed to make it interesting and fun for consumers.

Whole Grains. In a particular embodiment, various whole cereal grains may be used singly or in multi-grain combinations thereof to produce whole grain-containing composite products in accordance with embodiments of the present invention. Preferably, all grains are cooked together in one step in a cooker. The addition of multi grains in a single step helps to simplify the processing. The composite products preferably are made with 100% whole multi grains and are excellent source of whole grains with all the goodness of whole grains. The composite products are also a good source of fiber. In one embodiment, examples of whole grains which may be used in the production of composite products of the present invention are non-glutenous or low gluten content whole grains such as whole grain corn or corn kernels, oats or oat groats, barley, rye, rice, triticale, and mixtures thereof. In a particular embodiment, the whole grains processed using methods of the invention comprise non-glutenous or low-gluten content whole grains, singly or in combinations thereof, which consist of less than about 4 wt %, particularly less than about 3 wt %, and more particularly less than about 1 wt %, total gluten content thereof. A particular whole grain for use in the present invention is corn. The corn may be of the yellow, white or blue variety or mixtures thereof. High gluten content grains, such as wheat, may also be processed in accordance with methods of the present invention. For example, in embodiments of the invention, any whole grain wheat, such as whole grain soft/hard/durum wheat, or wheat berries may be used alone or in combination with one or more non-glutenous or low gluten content whole grains. In embodiments of the invention, whole grains, which are at least partially or fully defatted, such as defatted whole wheat berries, may be used alone or in admixture with full-fatted whole grains. In the production of multi-grain products, each whole grain may be employed in equal weight percentages or in different weight percentages.

The whole cereal grain particles employed may be in the form of the raw, whole, non-comminuted grain or berry or in the form of pre-cut, pre-ground, or comminuted whole grains. For example, the whole grain particles may be in the form of whole corn kernels, or pre-ground or comminuted corn kernels. Whole oat particles may be in the form of whole oat grains or berries, or pre-ground or pre-cut whole oat grains or pre-flaked whole oat grains. The starch of the whole grain particles employed in the present invention may be all or essentially all individual, crystalline starch granules, as determined by light microscopy starch characterization where a sample is stained with Lugol's Iodine and observed in Brightfield optics.

Although preferred in embodiments, the present invention is not limited to whole grains as the sole type of grain source that may be used in the production of the composite products. Composite products also may be made using methods of the invention from grain sources containing at least in part nonwhole grain ingredients (e.g., meals, grits, flours, starches, etc.). In addition, products optionally may be made without precooking the composite doughs before pelletizing them. That is, the doughs into which the fruit or vegetable is incorporated in the pelletized intermediate material alternatively may be doughs made from flours that are not heat treated, precooked and dried (e.g., masa flour, pregelatinized flour, partially gelatinized flour, presoaked and dried flour, toasted flour, other heat treated uncooked flour, etc.).

In embodiments of the present invention pre-ground or comminuted whole cereal grains are preferred because they hydrate and cook faster than whole grains or whole berries. For example, prior to cooking, whole cereal grains, such as whole corn kernels, may be pre-ground, milled or comminuted to a particle size of less than or equal to about ¼ inch, preferably less than or equal to about 0.2 inch, for example from about 0.05 inch to about 0.188 inch. In embodiments of the invention, comminuting, pre-grinding or milling of raw whole grains may be achieved using a conventional Fitz mill, Commitrol mill, or Urschel mill. For example, a Fitz Mill having a 0.093 inch or ⅛ inch round hole screen may be employed to obtain an average particle size distribution of about: 0.0% on a #6 screen, about 14.91% on a #14 screen, about 30.43% on a #20 screen, about 50.25% on a #40 screen, and about 4.41% on the pan.

In embodiments of the present invention, whole seeds or comminuted seeds or legumes, such as soy beans or soy bean grits may be admixed with the cereal grains to enhance protein content of the products of the present invention in amount, which does not adversely affect shreddability or flakability. Exemplary amounts of the seeds or legumes, which may be employed, may range up to about 60% by weight, based upon the total weight of the whole cereal grains.

In particular embodiments where the whole cereal grains include whole corn, lime is preferably employed to enhance flavor and also to enhance starch functionality and cohesiveness. Any food-grade lime or calcium hydroxide may be used in the present invention. The lime may be added in an amount sufficient to improve starch functionality and reduce tackiness of the corn-based composition, and to provide a masa flavor to the final product. Exemplary amounts of lime which may be used in embodiments of the present invention are from about 0.01% by weight to about 3% by weight, preferably from about 0.1% by weight to about 0.5% by weight, based upon the weight of the whole corn grains or kernels. Lime may be used alone or in combination with other quick cooking agents (such as disodium phosphate).

Fat Content. Whole grain-containing foods, such as ready-to-eat cereals, crackers, wafers, biscuits, or snack chips, of methods of the present invention may be full-fat, reduced fat, low-fat, or no-fat products. As used herein, a reduced-fat food product is a product having its fat content reduced by at least 25% by weight from the standard or conventional product. A low-fat product has a fat content of less than or equal to three grams of fat per reference amount or label serving. However, for small reference amounts (that is, reference amounts of 30 grams or less or two tablespoons or less), a low-fat product has a fat content of less than or equal to 3 grams per 50 grams of product. A no-fat or zero-fat product has a fat content of less than 0.5 grams of fat per reference amount and per label serving. For accompaniment crackers, such as a saltine cracker, the reference amount is 15 grams. For crackers, or biscuits or wafers, used as snacks, and for cookies, the reference amount is 30 grams. Thus, the fat content of a low-fat cracker, wafer, or cookie would therefore be less than or equal to 3 grams of fat per 50 grams or less than or equal to about 6% by weight fat, based upon the total weight of the final product. A no-fat accompaniment cracker would have a fat content of less than 0.5 grams per 15 grams or less than about 3.33% by weight, based upon the weight of the final product. A no-fat wafer having a label serving size of 32 grams would have a fat content of less than 0.5 grams per 32 grams or less than about 1.56% by weight, based upon the weight of the final product.

As previously discussed, shortening and similar fat content of the food product of the present invention can be reduced or eliminated as dough machining requirements for such ingredients are significantly reduced or eliminated by methods of the present invention. However, if used, oleaginous compositions which may be used in producing full-fat, reduced fat, or low-fat composite products in accordance with the present invention may include any known shortening or fat blends or compositions useful for baking or frying applications, and they may include conventional food-grade emulsifiers. Vegetable oils, lard, marine oils, and mixtures thereof, which are fractionated, partially hydrogenated, and/or interesterified, are exemplary of the shortenings or fats, which may be used, in the present invention. Edible reduced- or low-calorie, partially digestible or non-digestible fats, fat substitutes, or synthetic fats, such as sucrose polyesters or triacyl glycerides, which are process-compatible, may also be used. Mixtures of hard and soft fats or shortenings and oils may be used to achieve a desired consistency or melting profile in the oleaginous composition. Exemplary of the edible triglycerides which can be used to obtain the oleaginous compositions for use in the present invention include naturally occurring triglycerides derived from any vegetable sources such as soybean oil, palm kernel oil, palm oil, rapeseed oil, safflower oil, sesame oil, sunflower seed oil, canola oil, corn oil, olive oil and mixtures thereof. Marine and animal oils such as sardine oil, menhaden oil, babassu oil, lard, and tallow may also be used. Synthetic triglycerides, as well as natural triglycerides of fatty acids, may also be used to obtain the oleaginous composition. The fatty acids may have a chain length of from 8 to 24 carbon atoms. Solid or semi-solid shortenings or fats at room temperatures of, for example, from about 75° F. to about 95° F. may be used. Preferred oleaginous compositions for use in the present invention include vegetable oil products, such as partially hydrogenated soybean oil, palm oil, and mixtures thereof.

In embodiments of the invention, the amount of vegetable shortening or fat topically applied to composite products also may be reduced by more than 25 percent by weight to obtain reduced fat products having, for example, less than about 20% weight percent fat, preferably less than about 10% by weight fat, and more preferably less than 5% by weight based on the total weight of the baked or fried, finished composite product.

To provide a more lubricious mouthfeel to reduced fat, low-fat or no-fat products, a hydrocolloid gum, preferably guar gum, may be employed to compensate for the fat reduction as disclosed in U.S. Pat. No. 5,595,774 to Leibfred et al., the disclosure of which is herein incorporated by reference in its entirety. As disclosed in U.S. Pat. No. 5,595,774, the hydrocolloid gums are used in effective amounts which provide a lubricous, smooth, non-slippery mouthfeel to the baked or fried product. Exemplary amounts of the hydrocolloid gum, preferably guar gum, which may be used range from about 0.15% by weight to about 1.5% by weight, preferably from about 0.25% by weight to about 0.45% by weight, based upon the total weight of the whole berries or grains. Other gums, which may be used with guar gum, include xanthan gum and carboxymethyl cellulose, and gums, which form gels such as alginate gum, carrageenan gum, gum arabic, gum tragacanth, pectin, and locust bean gum, and mixtures thereof. Generally, the greater the extent of shortening or fat reduction, the greater the amount of gum utilized to compensate for the loss of lubricity or loss of smoothness in mouthfeel.

Cookers and Cooked Grain Products. For purposes of the atmospheric pressure cooking of the grain or berry according to the embodiment of FIG. 2 of this invention, it can be done in a dough mixer adapted for steam injection and open to the atmosphere, such as a Pearless or Shaffer mixer. For purposes of the vacuum or pressure cooking of the grain or berry according to the embodiment of FIG. 3 of this invention, it can be done in any standard cooking equipment, such as a rotary cooker, an immersion cooker, a vacuum cooker such as a Groen vacuum batch cooker, or a pressure cooker such as a Lauhoff pressure cooker, and so forth. Immersion cooking is generally at about atmospheric pressure or only about 2-3 psig. Pressure cooking is preferred because it quickly achieves full cooking or gelatinization of the whole grain particles with no, or essentially no white centers In embodiments of the present invention, the whole grain particles may be cooked at temperatures and humidities, which hydrate and at least substantially gelatinize the internal structure of the grains or berries such that only a pinhead of white or free starch remains visible in the center of the kernel. In embodiments of the invention, the degree of gelatinization may, for example, be at least 90%. In preferred embodiments the starch is essentially 100% gelatinized leaving no visible white centers in the whole grain particles. The degree of starch gelatinization may be measured by differential scanning calorimetry (DSC). Generally, starch gelatinization occurs when: a) water in a sufficient amount, generally at least about 25 to 30% by weight, based upon the weight of the starch, is added to and mixed with starch and, b) the temperature of the starch-water mixture is raised to at least about 80° C. (176° F.), preferably 100° C. (212° F.) or more. The gelatinization temperature depends upon the amount of water available for reaction with the starch. The lower the amount of available water, generally, the higher the gelatinization temperature.

As previously indicated and shown in FIG. 3, in a particular embodiment the fruit or veggie component and a portion of the whole grain particle ingredient may be vacuum cooked, and the remainder of the whole grain particle ingredient in combination with other dry ingredients such as starch, whole grain flour, leavening agent ingredients can be steam heated in the presence of water sufficient to develop gelatinized whole grain particles in the steam heated mixture, and then the resulting vacuum and steam heated mixtures can be combined and mixed to prepare dough, which is then machined, shaped and baked/fried as described elsewhere herein.

For purposes herein, gelatinization may be defined as the collapse (disruption) of molecular order within the starch granule, manifested in irreversible changes in properties such as granular swelling, native-crystallite melting, loss of birefringence, and starch solubilization. The temperature of the initial stage of gelatinization and the temperature range over which it occurs are governed by starch concentration, method of observation, granule type, and heterogeneities within the granule population under observation. Pasting is the second stage phenomenon following gelatinization in the dissolution of starch. It involves increased granular swelling, exudation of molecular components (i.e., amylose, followed by amylopectin) from the granules, and eventually, total disruption of the granules. See Atwell et al., "The Terminology And Methodology Associated With Basic Starch Phenomena," *Cereal Foods World*. Vol. 33, No. 3, Pgs. 306-311 (March 1988).

Exemplary cooking temperatures used for cooking under atmospheric pressure conditions pursuant to the embodiment of FIG. 2 may range, for example, from about 120° F. to about 200° F., particularly about 140° F. to about 160° F., which may vary depending on the type of whole grain being treated and the duration of the cooking cycle.

Exemplary immersion cooking temperatures used for vacuum or superatmospheric pressure conditions pursuant to the embodiment of FIG. 3 may range from about 190° F. to about 212° F. Immersion cooking of the whole grain wheat may occur at about 210° F. at atmospheric pressure using steam for about 30 to about 36 minutes. The cooking can include a "come-up time" of between 6.5 to about 8 minutes during which the temperature of the grain in the vat or cooking vessel is elevated from ambient temperature to the cooking temperature. But preferably, before cooking, the whole grain particles are added to hot water at a temperature of about 170° to 190° F. in the cooker. The whole grain particles may be added to the hot water in a rotating cooker, for example, over a time period of about 50 to about 100 seconds. The amount of water used in the immersion-cooking step may range from about 28% by weight to about 70% by weight based upon the total weight of the grains or berries and added water. The moisture content of the cooked grain, after draining may range from about 29% by weight to about 60% by weight, preferably from about 29% by weight to about 42% by weight.

In preferred embodiments, where positive (superatmospheric) pressure cooking with direct steam injection is employed such as in the embodiment of FIG. 3, pressure cooking temperatures may be at least about 235° F., preferably at least about 250° F., most preferably from about 268° F. to about 275° F. Exemplary pressure cooking pressures may range from about 15 psig to about 30 psig, preferably from about 20 psig to about 28 psig with cooking times ranging from about 15 minutes to about 45 minutes, preferably from about 20 minutes to about 30 minutes. The pressure cooking may include a "come-up time" as in immersion cooking of between 6.5 to about 8 minutes during which the temperature of the grain in the vat or cooking vessel is elevated from ambient temperature to the cooking temperature. But preferably, before cooking, the whole grain particles are admixed with hot water at a temperature of about 170° to 190° F. in the pressure cooker. The whole grain particles may be added to the hot water, or vice versa, in a rotating cooker, for example, over a time period of about 50 to about 100 seconds. Fruit or vegetables, and other ingredients such as salt and lime in the case of corn grain cooking, may be added in the cooker with the water as a pre-blend or added separately. As in the previous discussed embodiments, the dough formulation also may include one or more minor dough ingredients, such as leavening agents, baking soda, vegetable oil, honey, salt, and so forth.

For the embodiment of FIG. 3, pressure-cooking is preferred over immersion cooking because it provides better control over obtaining desired water content in the cooked whole grain particles and reduces or eliminates the need for drying of the cooked grain particles to achieve desired moisture content for shredding. Generally, in pressure cooking all of the water added is absorbed or taken up by the whole grain particles. In addition, steam which is directly injected into the pressure cooker condenses and is taken up by the whole grain particles, generally in an amount of about 1% by weight to about 3% by weight, based upon the total weight of the cooked whole grain particles. Generally, draining of water after pressure-cooking is not needed because all or substantially all of the added water and steam condensate is taken up by the cooked whole grain particles.

The amount of water added in the pressure cooking step, not including steam condensate, may range from about 12% by weight to about 30% by weight based upon the total weight of the grains or berries and added water. If moisture-containing fruit or vegetables are included in the mixture that is cooked, the moisture content thereof can effectively reduce external moisture requirements for cooking. The moisture content of the cooked grain, which includes water inherently present in the raw grain, after draining if needed, may range from about 29% by weight to about 42% by weight preferably from about 33% by weight to about 38% by weight, based upon the weight of the cooked whole grain particles.

During cooking, moisture tends to collect on the grain particles or berries. This moisture can increase the stickiness of the cooked grain and can cause handling problems when the grain is transferred to other apparatus. Mixing the grain in the cooking vat at low rotation speeds provide for even cooking and reduce lumping.

The cooked whole cereal grain particles and any other food components present may be passed through a lump breaker to break apart any large lumps or agglomerates of cooked whole cereal grain particles prior to further dough processing.

After cooking, the starch granules of the cooked whole cereal grain particles are no longer crystalline in nature and are swollen or larger in size, as determined by light microscopy starch characterization using Lugol's Iodine. The cooked particles may contain swollen granules as well as agglomerated starch clusters.

Low Shear Extruder. In the embodiment of FIG. 3, the cooked whole grain particles, and any other food components present, are transferred such as by means of belt conveyers to an extruder for forming them into an extrudate. Commercially available low shear extruders may be employed to produce the whole grain extrudate under low shear from the combination of cooked whole grain particles and fruit/vegetables. The cooked whole grain/fruit or vegetable mixture is fed into an extruder unit including a low-shear screw feed (single or double screw). The low-shear screw feed particularly may comprise an intermeshing twin screw feed operable at low speeds and fitted with minimal clearance relative to the inner surface of a generally cylindrical extruder chamber (barrel) that houses the twin-screw mechanism. The screws either rotate in the same direction (co-current) or in opposite direction (counter-current) to each other. After entering the low-shear screw feed, the mass is mixed and folded together. The extruder may be equipped with a vacuum pump, which evacuates air from space within the extruder barrel where the screw feed is housed and the mass therein to assist in forming a substantially continuous homogeneous mass in the extruder, which is substantially free of air pockets. In one particular embodiment, the vacuum pump is combined with a screw extruder as an integral unit, and such integrated devise are commercially available, e.g., VEMAG robot model HP-15C, manufactured by Robert Reiser & Co., which are packaged as integrated units with a twin screw feed assembly for meat stuffing operations. The extruder preferably includes cooling jackets provided to control the temperature of the dough in the extruder and to control the temperature of the extruder exiting the extruder. The mass is conveyed as a viscous, substantially continuous, uninterrupted homogeneous mass by the twin or single screw feed out of a discharge outlet of the extruder. The cooling jackets help to remove heat generated by the shearing action occurring in the extruder and at the die plate as the doughy mass is forced through the die plate apertures. In embodiments of the invention, the die plate may have a plurality of holes or apertures at the discharge end having opening geometries corresponding to the desired cross-sectional shape of the extrudate.

The extrudate exiting the extruder represents prepared dough for purposes of this embodiment of the present invention. The extrudate may be in the form of continuous ropes, noodles, strands, bars or other cross-sectional shapes suitable for forming the dough into desired shapes and sizes. In accordance with the method of the present invention, the extrusion pressure, as measured at the die plate, may be from about 300 psig to about 700 psig, preferably from about 400 psig to about 500 psig. The pressures and temperatures employed preferably result in no or substantially no expansion of the extrudate exiting the die orifices. Also, the temperature of the dough exiting the extruder should be sufficiently low so that any increase in temperature caused by the shaping operation does not result in deleterious sticking of the dough to the downstream sheeting or molding rolls. Generally, the temperature of the shaped dough pieces may be up to about 120° F. to about 135° F. without substantial sticking problems. The extruding temperature may be controlled by use of the cooling jackets to provide an extrudate temperature of from about 75° F. to about 135° F., preferably from about 90° F. to about 110° F., for example from about 90° F. to about 110° F., for example from about 95° F. to about 105° F., upon exiting the extruder die plate. In embodiments of the invention, cooling air may be supplied at the exit of the plate to cool the exiting extrudate to help avoid stickiness problems. The dough exiting the extruder has a soft, pliable, cohesive texture.

Dough Forming/Shaping/Cutting. In the embodiments of FIGS. 2 and 3, the dough that is prepared is then formed into a plurality of discrete dough pieces or units. The dough units or pieces may be formed having substantially uniform shapes and sizes for a given production run or batch, although that is not required. Combinations of differently shaped or sized pieces may be desired in some products.

In forming the dough into individual pieces of desired geometries, the whole grain-containing dough preferably is immediately or relatively quickly, for example, within about 20 minutes, preferably within about 10 minutes, transported to sheeting and cutting or rotary molding, or other forming devices, so as to avoid any substantial hardening of or skin formation on the soft, pliable extrudate. In embodiments of the invention, the whole grain extrudate may be transferred by means of pneumatic conveyors or belt conveyors which feed the sheeting or rotary molding equipment, or other forming devices.

The dough pieces may be sheeted and cut using conventional equipment set-ups used for such purposes in production of chip-like or wafer-like food products. Alternatively, the dough may be shaped and sized using a rotary molder. Shaping and sizing of the dough pieces is preferably by sheeting and cutting/forming the dough. The sheeting may be performed between counter-rotating rollers. The sheeted dough is cut and formed into dough pieces of desired shape and size, such by rotary molding or by other conventional dough cutting devices. The pieces may also be formed without sheeting, such via direct rotary molding of the fresh dough. The doughs of the present invention may also be formed into discrete pieces of desired shape and size by other dough forming machines such as extruders, Formax machines, wire cutting machines, encrusting machines, rotary cutters, stamp cutters, and the like.

In one particular embodiment, the dough is sheeted between conventional, counter-rotating sheeting rolls prior to rotary molding. The thickness of the dough sheet may be about the same as the thickness of the dough pieces formed from the dough sheet. Formation of the dough sheet facilitates consistent feeding of the dough to a rotary molder. The dough optionally may be passed through a kibbler prior to sheeting and prior to rotary molding so as to eliminate lumps. Commercially available rotary molders may be used in the apparatus of the present invention, such as those produced by Weidenmuller Co., Morton Grove, Ill. The rotary molder forms the dough mass or dough sheet, which is fed to it into shaped or molded pieces. The pieces take on the shape of the individual molds or cavities of the die roll or molding roller. The dough pieces also take on an impression or embossment from the molds or dies of the rotary molder. As generally known, the forming roll of a rotary molder presses dough into individual molds or cavities thereof to form individual dough pieces. The individual molded dough pieces may be removed from the molds or cavities of the die roll for transport to the next processing station (i.e., an oven or other baking or frying device). Alternatively, the dough may be sheeted and wire cut into desired shapes and sizes.

Dough Units/Pieces. The shape of the dough units or pieces may be square, round, wave shape, rectangular, elliptical, parallelepiped, triangular, jig saw puzzle shapes and the like.

In embodiments of the present invention, generally the thickness of the sheeted and cut, or rotary molded dough pieces, may range from about 0.02 inch to about 0.10 inch, preferably from about 0.03 inch to about 0.08 inch, for example from about 0.04 inch to about 0.06 inch, although not limited thereto.

Baking and Frying. The shaped and sized dough pieces are then transported, such as by being conveyed, to an oven or other cooking device for baking or frying the dough pieces. The shaped and cut dough pieces may be dried, baked, fried, and/or toasted in conventional equipment. Suitable ovens for drying, baking and toasting the dough pieces include, e.g., Proctor & Schwartz, Wemer-Lehara, Wolverine and Spooner ovens containing forced air and gas fired burners and a conveyor. Suitable equipment for frying includes Heat and Control, FMC/Stein oil fryers. The dough pieces may be toasted to enhance the flavor and brown the edges of the products. Baking or frying of dough pieces does not substantially puff or leaven them and provides a substantially flat, thin, chip-like appearance.

Temperature profiles used for drying, baking, frying and toasting of the dough pieces may generally be within the range of about 200° to about 700° F. The baking is preferably performed in a zoned oven using low oven velocity to avoid excess curling, separating or warping of the strips during baking. The total time for drying, baking, frying and/or toasting may be such so as to avoid browning (except on the edges of the pieces). It depends upon thickness of the product, the size of the product and the type of oven. The total time for drying, baking, frying and/or toasting may range from about 1 minutes to about 10 minutes. The cut, whole grain laminate may be fried and toasted in conventional frying and toasting equipment Heat and Control of Hayward, Calif. and FMC/Stein of Sandusky, Ohio make suitable fryers, which may have direct or indirect heated oil and a conveyor. The temperature profiles used in the fryer for frying and/or toasting may generally be within the range of 300° F. to 400° F. The total time for frying and/or toasting is preferably less than 3 minutes, and the final moisture of the resulting product is typically about 1 to about 3% by weight. If the moisture of the resulting product is above about 3% by weight, then crispness may suffer, and if the moisture is less than about 1% by weight, then the product may have excessive oiliness, a darker color, and a scorched flavor. After baking or frying, the starch of the products may be in the form of agglomerated starch clusters with virtually no individual starch granules, as determined using light microscopy starch characterization with Lugol's Iodine.

The color of the final baked or fried product may be a substantially uniform off white to golden tan color. The product may be topped with salt (for example, 0.5 to 2 weight percent, based on the total product weight) prior to baking or flying. The salt provides flavor and flavor enhancement. Some of the salt (NaCl) can be replaced with KCl or other salt substitutes.

Fat or shortening, when used in embodiments of the invention can be applied, preferably by spraying in oil form, to the top and bottom surfaces of baked or fried snacks having no added fat or having only fat inherent in the cereal grain. For example, whole-wheat berries generally have an inherent fat content of about 2% to 4% by weight. See, *Wheat: Chemistry and Technology*. Vol. 11, Pomeranz, ed., Amer. Assoc. of Cereal Chemists, Inc., St. Paul, Minn., p. 285 (1988). In embodiments of the invention, the topical application of oil to baked or fried snacks having no other added fat may result in baked or fried products having a total fat content of less than about 20% by weight, preferably less than about 10% by weight. In other embodiments the amount of topically applied oil may be less than about 8% by weight, for example less than about 6% by weight, based upon the weight of a chip-like snack. Use of a hydrocolloid gum provides for obtaining a slippery or smooth mouthfeel and a glossy appearance even with no added fat.

In a preferred embodiment, the snacks products containing the whole grain and fruit or veggie content in accordance with embodiments of the present invention are crunchy chip-like snack products, instead of being chewy type snack foods.

Optional Post-Treatments: Seasoning/Oiling and Packaging. The baked or fried products can be directly packaged, or may be seasoned and/or oiled, fortified with vitamins/minerals, and/or coated with preservative before packaging. For example, whole grain composite products of the present invention may contain one or more additives (e.g., vitamins, minerals, colorants, flavorants, etc.) at effective levels of concentration. Exemplary thereof are sugars such as sucrose, fructose, lactose, dextrose, and honey, polydextrose, dietary fiber, seasonings, such as onion, garlic, parsley/other herbs, and bouillon, malt, wheat germ, nuts, cocoa, flavorants such as fruit flavoring, cracker flavoring, cinnamon, and vanilla flavoring, any acidulants such as citric acid, lactic acid, malic acid and other preservatives such as TBHQ, antioxidants such as tocopherol and BHT, food colorant, emulsifiers such as Myvatex 7 (a blend of distilled monoglycerides manufactured by Eastman Kodak), sodium stearoyl lactylate, lecithin, and polysorbate 60, and vitamins and/or minerals. Whole grain and whole grain and fruit composite products can also be enrobed with real or compound coating of chocolate for indulgence. Examples of suitable vitamins and minerals include B-complex vitamins, soluble iron compounds, calcium sources such as calcium carbonate, vitamin A, vitamin E, and vitamin C. Also, non-fat dry milk solids. (i.e., milk powder) or soybean protein may be added in an amount sufficient to create a final protein level of from about 10 to about 20 weight percent. Such additional ingredients may range up to about 30 weight percent, based on the total dry weight of the final product.

Additives, such as vitamins and minerals, may be topically applied to the baked or fried product and/or may be dry blended with an optional hydrocolloid gum and then the dry blend may be admixed with the cooked whole grain particles prior to sheeting or low shear extruding, depending on the process route. Additives or fillings, particularly those which may adversely affect sheeting or rotary molding preferably are applied to the dough pieces by depositing them on the dough pieces after those operations are completed. These additives preferably are topically applied to the dough pieces after shaping and sizing, and before or after baking or frying. For instance, seasonings, oils, flavorants, fortifying agents, and/or preservatives may be topically applied to the baked or fried goods. Specific examples of the additives include, for example, salt, sucrose, fructose, lactose, dextrose, polydextrose, fiber, milk powder, cocoa, and/or flavorants. The additives may be full-fat, no-fat, reduced-fat or low fat. Topically applied oil may be used as a carrier for one or more additives, such as flavorants or seasonings. Topical application of additives may be achieved using conventional dispensing apparatus such as disclosed in U.S. Pat. No. 5,707,448 to Cordera et al., for Apparatus for the Application of Particulates to Baked Goods and Snacks, and the disclosure of which is herein incorporated by reference in its entirety.

After baking or frying, and any optional oil and/or seasoning addition, the finished products are in the form of loose individual pieces of product such as chip-like snacks, wafers, ready-to-eat cereals, biscuits, and the like. Composite food products of the present invention may have a moisture content of less than about 5% by weight, preferably about 0.5 to about 3 wt. %, more preferably about 1 to 2 wt. %, based on the total weight of the baked or fried, finished product. The final product may be baked or fried to a shelf stable relative humidity or "water activity" of less than about 0.7, preferably less than about 0.6. It may have a shelf stability of at least about 2 months, preferably at least about 6 months, more preferably at least about 12 months, when stored in proper, sealed packaging.

Although the composite food products of this invention preferably are made with doughs incorporating fruit or vegetable content as illustrated herein, it will be understood that these food products also optionally may be prepared without adding the fruit or vegetable content to the doughs, with processing otherwise proceeding in a generally similar manner as described herein relative to the applicable embodiment, with the understanding that benefits of the fruit/vegetable component will be absent from the ultimate product.

All parts and percentages described herein are by weight unless otherwise indicated. The following examples further illustrate the present invention.

Example 1

Multi-whole grain and fruit-containing sheeted snack: The ingredients and their relative amounts that may be used to produce a thin, crisp, chip-like, multi-whole grain and fruit sheeted snack are:

TABLE 1

Batch formula for whole grain and sheeted fruit chips

| Ingredients | Wt. % |
| --- | --- |
| Whole grain yellow corn | 27.11 |
| Whole grain rice flour | 12.84 |
| Unmodified corn Starch | 11.42 |
| Vegetable Oil | 1.14 |
| Whole evaporated apples | 12.84 |
| Whole air dried apple powder | 5.71 |
| Leavening agents | 0.41 |
| Water | 28.53 |
| Total | 100 |

TABLE 2

Formula for seasoning/oiling

| Ingredients | Wt. % |
| --- | --- |
| Baked chips to 2% moisture | 82.0 |
| Vegetable Oil | 6.0 |
| Seasoning | 6.0 |
| Granulated sugar | 6.0 |
| Total | 100 |

A pre-ground whole grain was prepared by separately milling the raw whole grain yellow corn with a Fitz mill having a 0.093 inch round hole screen. Whole white corn or any other colored whole corn may be used instead of whole yellow corn for these examples. The water was added to a Peerless or Shaffer dough mixer adapted for steam injection and open at its top to the atmosphere. The water temperature was adjusted to and maintained at about 140° F.-160° F. Then, the Fitzmilled whole grain yellow corn was combined with the water in the dough mixer. The mass in the cooker was heated with steam to maintain the above-indicated temperature and cooked for about 5-30 minutes under atmospheric pressure condition (approximately 14.7 psia) to fully or essentially fully gelatinize the starch content of the whole grain particles.

The rice flour, unmodified corn starch and whole evaporated apples were added to the gelatinized preground whole corn particles in the dough mixer and the combination was mixed therein until a uniform mixture of the dough ingredients was obtained having a dough-like consistency. The resulting dough-like mixture was cooled to a temperature at or above ambient temperature, although this is not required, before being discharged from the dough mixer. The dough-like mixture was not tempered. The dough-like mixture had a moisture content of about 35% by weight to about 40% by weight.

The dough-like mixture was conveyed to counter-rotating sheeting rollers and then cut/formed using rotary cutter or stamp cutter, to provide individual dough pieces or units having any shapes which had a thickness of about 0.02-0.10 inch and side edge dimension of about 0.5-3.0 inch. The dough pieces still had similar moisture content as the original dough.

The dough pieces/units were transferred to a multi-zone oven for drying, baking and toasting for about 1 to 7.5 minutes at temperatures ranging from about 200° F. to about 700° F. The baked product leaving the oven may have an end point moisture content of about 2% by weight, based upon the weight of the final product.

After exiting the oven, the baked product pieces/units were oiled and seasoned in a seasoning drum or tumbler as a seasoning mixture as described in Table 2. Soybean oil or other vegetable oils may be topically applied as a fine spray to the top and bottom of the baked snack preform strips, followed by the application of sweet or savory seasonings. It will be appreciated that the post-baking treatment of the baked product pieces with the oil and seasoning formula is optional. The baked product pieces may be consumed as is. Alternatively, the baked product pieces containing fruit content optionally may be oiled or seasoned, but not both.

The baked dough pieces substantially retained the shape and size of the dough pieces. The baked dough pieces had a crispy chip-like texture and were pleasantly multi-flavored including a distinctive fruit flavor. The baked pieces/units may be conveyed as individual snack pieces to packaging, such as conventional packaging used for snack chips or thin cracker wafers. The snack chips may be used for hand-to-mouth snacking and may be used for dipping without breakage.

Example 2

Multi-whole grain and Vegetable-containing sheeted snack: The ingredients and their relative amounts that may be used to produce a thin, crisp, chip-like, multi-whole grain and vegetable sheeted snack are:

TABLE 3

Batch formula for whole grain and sheeted veggie chips

| Ingredients | Wt. % |
| --- | --- |
| Whole grain yellow corn | 27.48 |
| Whole grain rice flour | 13.02 |
| Frozen vegetables | 5.78 |
| Dry vegetables | 13.02 |
| Vegetable Oil | 1.16 |
| Starch | 11.56 |

TABLE 3-continued

Batch formula for whole grain and sheeted veggie chips

| Ingredients | Wt. % |
|---|---|
| Dough salt | 0.38 |
| Leavening agents | 0.41 |
| Water | 27.19 |
| Total | 100 |

TABLE 4

Formula for seasoning/oiling

| Ingredients | Wt. % |
|---|---|
| Baked chips to 2% moisture | 82.0 |
| Vegetable Oil | 12.0 |
| Seasoning | 6.0 |
| Total | 100 |

In this example, a baked whole-grain composite food product was prepared in a generally similar manner as described in Example 1 with several formulation changes; most notably, the fruit ingredient of the dough formulation of Example 1 was replaced with a vegetable blend and the seasoning mixture was modified, as indicated in Tables 3-4. The resulting baked dough pieces had a crispy chip-like texture and were pleasantly multi-flavored including a distinctive veggie flavor It again will be appreciated that the post-baking treatment of the baked product pieces with the oil and seasoning formula is optional. The baked product pieces may be consumed as is. Alternatively, the baked pieces containing veggie content optionally may be oiled or seasoned, but not necessarily both.

Example 3

Multi-whole grain and Fruit-containing sheeted snack via vacuum/steam cooking: The ingredients and their relative amounts that may be used to produce a thin, crisp, chip-like, multi-whole grain and fruit sheeted snack made with a combined dough formulation combining a vacuum cooked formula including a fruit component and whole grain and a steam heated formula including whole grain, starch, and flour ingredients, are the following:

TABLE 5

Combined Dough Formulation (dry basis)

| Ingredients | Wt. % |
|---|---|
| Fresh cored apples | 73.04 |
| Whole grain yellow corn (from vacuum process formula) | 6.74 |
| Citric acid | 0.22 |
| Whole grain yellow corn (from steam process formula) | 7.75 |
| Whole grain rice flour | 6.09 |
| Waxy maize Starch | 5.41 |
| Vegetable Oil | 0.54 |
| Leavening agents | 0.19 |
| Total | 100 |

TABLE 6

Batch formula for vacuum process of fruit

| Ingredients | Wt. % |
|---|---|
| Fresh cored apples | 93.3 |
| Whole grain yellow corn | 6.5 |
| Citric acid | 0.2 |
| Total | 100 |

TABLE 7

Batch formula for steam heating

| Ingredients | Wt. % |
|---|---|
| Whole grain yellow corn | 27.61 |
| Whole grain rice flour | 21.68 |
| Waxy maize Starch | 19.28 |
| Vegetable Oil | 1.93 |
| Leavening agents | 0.70 |
| Water | 28.80 |
| Total | 100 |

Fresh apples (85 lbs.) were cleaned and had their cores and seeds removed to yield around 65 lbs. apple ingredient. The apple ingredient was combined with 4.5 lbs. ground whole grain yellow corn, and the mixture was passed through a continuous crusher with addition of 0.2 lbs. citric acid. The resulting crushed mixture, i.e., the formula of Table 6, was introduced into a Groen vacuum batch cooker under 5 psi vacuum (about 190° F.) to reduce moisture until around 35 Brix soluble solids (yields approximately 45 lbs.). The other dry ingredients described in the formula of Table 7 were steam heated in a similar manner as in Examples 1-2, but with the moisture level kept lower (approximately 30 to 40%). The vacuum cooked and steam heated mixtures were combined with mixing to form dough containing 40% moisture content. The resulting dough was sheeted, cut, and baked in similar manners as in Example 1. The product contained 10 g of apple per 30 g serving size on an "as is" basis. The application of a seasoning/oil formulation, such as described in Example 1, to the baked product pieces of this example is optional.

It will be appreciated that batch or continuous vacuum processes (or no vacuum, vacuum reduces process time, helping remove moisture, boil at temperature less then 212° F. (100° C.), and reduce chemical changes) may be used to convert fresh crushed fruits or vegetables (80 to 95% moisture) into lower moisture material (50 to 60% moisture) half-processed ingredients. Preferably, up to about 20% dry flour or other ingredients may be added into the above mixture during the above process to help reduce moisture, since water in the fruits (or vegetables) could be used in the dough system. Regular batch steam process (e.g., cooking at a few pounds above atmosphere pressure) used in this invention is used to prepare pre-gelatinized dough at around 30 to 40% moisture. Mixture of the above two materials is done to form final dough with high fruits or vegetables content (because some of the water has been removed during precooking process). There may be too much moisture in the dough without the above-described pre-treatment process, which would result in very soft dough that may be unsuitable for further sheeting/molding operations.

It will be understood that various changes in the details, materials, and arrangements of formulations and ingredients, which have been herein described and illustrated in order to explain the nature of the invention may be made by those skilled in the art within the principle and scope of the invention as expressed in the appended claims

What is claimed is:

1. A method for producing a whole-grain containing composite food product, comprising the steps of:
   (1) preparing a moist dough, comprising:
      combining whole grain cereal particles and water
      cooking the combination at a temperature of about 120° F. to about 200° F. for an amount of time effective to gelatinize starch content of the whole grain cereal particles and to provide a heated mass,
      mixing the heated mass with starch, whole grain flour, optional leavening agent, and a food component selected from the group consisting of vegetables and fruits, effective to prepare a moist dough having a moisture content of about 25 wt. % to about 50 wt. %, to provide moist dough which is cohesive and machinable without the addition of sugar or fat;
   (2) forming the moist dough into discrete moist dough units; and
   (3) baking or frying the moist dough units to provide a whole-grain containing composite food product having a final moisture content of less than 5 wt. %, wherein the composite food product substantially retains the size of the discrete moist dough units.

2. A method for producing a whole-grain containing composite food product according to claim 1, wherein the cooking comprises heating the whole grain cereal grain particles in the presence of the water including injected steam in a dough mixer under atmospheric conditions, and wherein the cooking and mixing steps are conducted separately in that respective order.

3. A method for producing a whole-grain containing composite food product according to claim 2, wherein said mixing further includes adding waxy maize starch and pregelatinized whole grain flour in amounts effective to reduce moisture content of and increase stiffening of the moist dough.

4. A method for producing a whole-grain containing composite food product according to claim 3, wherein said forming comprises sheeting and cutting the dough into discrete moist dough units of preselected shape and size.

5. A method for producing a whole-grain containing composite food product according to claim 3, wherein said forming comprises feeding the moist dough into a rotary molder for rotary molding of the moist dough into discrete moist dough units of preselected shape and size.

6. A method for producing a whole-grain containing composite food product according to claim 1, wherein the cooking comprises heating the whole grain cereal grain particles in the presence of the water in a holding container under vacuum or superatmospheric pressure conditions.

7. A method for producing a whole-grain containing composite food product according to claim 6, wherein the cooking and mixing steps are conducted separately or concurrently.

8. A method for producing a whole-grain containing composite food product according to claim 6, wherein said moist dough preparing further comprises passing the mixture of gelatinized whole grain cereal grain particles and the food component through a low shear extruder to provide an extrudate.

9. A method for producing a whole-grain containing composite food product according to claim 8, wherein said forming comprises feeding the extrudate through sheeting rolls and cutting the extrudate into the discrete moist dough units of preselected shape and size.

10. A method for producing a whole-grain containing composite food product according to claim 8, wherein said forming comprises feeding the extrudate into a rotary molder for rotary molding of the extrudate into discrete moist dough units of preselected shape and size.

11. A method for producing a whole-grain containing composite food product according to claim 1, wherein the provided whole-grain containing composite food product is shelf-stable for at least six months.

12. A method for producing a whole-grain containing composite food product according to claim 1, wherein said food component is selected from the group consisting of vegetables and fruit, and the composite food product comprises the food component in a range amount of from about 1 wt. % to about 60 wt. %, on a dry weight basis, of the composite food product.

13. A method for producing a whole-grain containing composite food product according to claim 1, wherein said food component is selected from the group consisting of vegetables and fruit, and the composite food product comprises the food component in a range amount of from about 10 wt. % to about 32 wt. %, on a dry weight basis, of the composite food product.

14. A method for producing a whole-grain containing composite food product as claimed in claim 1, wherein the whole grain particles comprise at least one member selected from the group consisting of rye, oats, rice, barley, corn, wheat, and triticale.

15. A method for producing a whole-grain containing composite food product as claimed in claim 1, wherein the food component comprises vegetables in a form selected from whole vegetables, whole frozen vegetables, whole evaporated vegetables, whole vegetable juices, whole vegetable purees, whole vegetable powders, and any combination thereof.

16. A method for producing a whole-grain containing composite food product as claimed in claim 1, wherein the food component comprises vegetables selected from the group consisting of onions, sweet potatoes, potatoes, cabbage, carrots, spinach, broccoli, peas, beans, peppers, zucchini, okra, Brussels sprouts, cucumber, tomatoes, and any combinations thereof.

17. A method for producing a whole-grain containing composite food product as claimed in claim 1, wherein food component comprises vegetables, and the whole grain particles and vegetables are mixed in a mixing ratio of about 20:80 to about 95:05, on a wt %:wt % basis, respectively.

18. A method for producing a whole-grain containing composite food product as claimed in claim 1, wherein the food component comprises fruit in a form selected from whole fruits, whole frozen fruits, whole evaporated fruits, whole fruit juices, whole fruit purees, whole fruit powders, and any combination thereof.

19. A method for producing a whole-grain containing composite food product as claimed in claim 1, wherein the food component comprises fruit selected from the group consisting of apples, strawberries, blueberries, raspberries, blackberries, peaches, apricots, pears, pineapples, oranges, grapes, cranberries, bananas, citrus fruits, figs, prunes, and any combination thereof.

20. A method for producing a whole-grain containing composite food product as claimed in claim 1, wherein the food component comprises fruit, and the whole grain particles and fruit are mixed in a mixing ratio of about 20:80 to about 95:05, on a wt %:wt % basis, respectively.

21. A whole-grain containing composite food product formed by the method of claim 1, that is shelf-stable for at least six months.

22. The whole-grain containing composite food product of claim 21, wherein said food component is selected from the group consisting of vegetables and fruit, and the composite food product comprises the food component in an amount ranging from about 1 wt. % to about 60 wt. %, on a dry weight basis, of the composite food product.

23. The whole-grain containing composite food product of claim 21, wherein said food component is selected from the group consisting of vegetables and fruit, and the composite food product comprises the food component in an amount ranging from about 10 wt. % to about 32 wt. %, on a dry weight basis, of the composite food product.

24. The whole-grain containing composite food product of claim 21, wherein the food product is selected from the group consisting of savory snacks, sweet snacks, and ready-to-eat cereals.

25. A method for producing a whole-grain containing composite food product as claimed in claim 1, wherein the whole grain cereal grain particles have a particle size of about 0.05 inch to about 0.188 inch.

26. A method for producing a whole-grain containing composite food product as claimed in claim 1, wherein the final moisture content is about 0.5 wt. % to about 3 wt. %.

27. A method for producing a whole-grain containing composite food product as claimed in claim 1, wherein the method further includes cooling the moist dough to a temperature above or at about ambient temperature to provide a cooled moist dough, and forming the cooled moist dough into cooled moist dough units.

28. A method for producing a whole-grain containing composite food product as claimed in claim 2, wherein the whole-grain containing composite food product essentially resembles a chip having a final moisture content of about 0.5 wt. % to about 3 wt. % effective to provide a crisp texture.

29. A method for producing a whole-grain food product, comprising:
(1) preparing a moist dough, comprising:
combining whole grain cereal particles and water;
cooking the combination at a temperature of about 120° F. to about 200° F. for an amount of time effective to gelatinize starch content of the whole grain cereal particles and to provide a heated mass;
mixing the heated mass with starch, whole grain flour, and a particulate vegetable component, effective to prepare a moist dough having a moisture content of about 25 wt. % to about 50 wt. %, to provide moist dough which is cohesive and machinable without the addition of sugar or fat;
(2) sheeting and cutting the moist dough into discrete moist dough units; and
(3) baking or frying the moist dough units to provide a whole-grain containing composite food product having a final moisture content of less than 5 wt. %, wherein the composite food product substantially retains the size of the discrete moist dough units.

30. A method for producing a whole-grain food product according to claim 29, wherein the cooking comprises heating the whole grain cereal grain particles in the presence of the water including injected steam in a dough mixer under atmospheric conditions, and wherein the cooking and mixing are conducted separately in that respective order.

31. A method for producing a whole-grain food product according to claim 29, wherein the cooking comprises heating the whole grain cereal grain particles in the presence of the water in a holding container under vacuum or superatmospheric pressure conditions.

32. A method for producing a whole-grain food product according to claim 31, wherein the cooking and mixing are conducted separately or concurrently.

33. A method for producing a whole-grain food product, comprising:
(1) preparing a moist dough, comprising:
combining whole grain cereal particles and water;
cooking the combination at a temperature of about 120° F. to about 200° F. for an amount of time effective to gelatinize starch content of the whole grain cereal particles and to provide a heated mass;
mixing the heated mass with starch, whole grain flour, and a food component selected from the group consisting of vegetables and fruits, effective to prepare a moist dough having a moisture content of about 25 wt. % to about 50 wt. %, to provide moist dough which is cohesive and machinable without the addition of sugar or fat;
(2) sheeting and cutting the moist dough into discrete moist dough units; and
(3) baking the moist dough units to provide a whole-grain containing composite food product having a final moisture content of less than 5 wt. %, wherein the composite food product substantially retains the shape and size of the discrete moist dough units.

34. A method for producing a whole-grain containing composite food product as claimed in claim 33 wherein the food component is a vegetable.

35. A method for producing a whole-grain containing composite food product as claimed in claim 34, wherein the vegetable is selected from the group consisting of onions, sweet potatoes, potatoes, cabbage, carrots, spinach, broccoli, peas, beans, peppers, zucchini, okra, Brussels sprouts, cucumber, tomatoes, and combinations thereof.

36. A method for producing a whole-grain containing composite food product as claimed in claim 33 wherein the food component is a fruit.

37. A method for producing a whole-grain containing composite food product as claimed in claim 36 wherein the fruit is selected from the group consisting of apples, strawberries, blueberries, raspberries, blackberries, peaches, apricots, pears, pineapples, oranges, grapes, cranberries, bananas, citrus fruits, figs, prunes, and combinations thereof.

* * * * *